United States Patent [19]

Vondran, Jr.

[11] Patent Number: 5,392,061
[45] Date of Patent: Feb. 21, 1995

[54] PIXEL RESOLUTION ENHANCEMENT EMPLOYING ENCODED DOT SIZE CONTROL

[75] Inventor: Gary L. Vondran, Jr., Boise, Id.

[73] Assignee: Hewlett-Packard Company, Palo Alto, Calif.

[21] Appl. No.: 10,026

[22] Filed: Jan. 25, 1993

[51] Int. Cl.$^6$ ............................................. B41J 2/435
[52] U.S. Cl. ...................................... 347/252; 358/296
[58] Field of Search ................. 346/1.1, 76 L, 107 R, 346/108, 160; 358/296, 300, 302

[56] References Cited

U.S. PATENT DOCUMENTS

| | | | |
|---|---|---|---|
| 4,780,711 | 10/1988 | Doumas | 340/728 |
| 4,847,641 | 7/1989 | Tung | 346/160 |
| 5,249,242 | 9/1993 | Hanson et al. | 382/54 |

*Primary Examiner*—Mark J. Reinhart

[57] ABSTRACT

A laser printer includes a Resolution Enhancement driver for causing modulation of image edge pixels. The printer comprises a laser for discharging an electrophotographic surface in accordance with an applied modulation signal. A control processor applies modulation signals to the laser in accordance with received commands. A format controller determines if an image pixel resides at an edge of an image feature and, if so, selects a pixel modification to enhance a representation of the feature edge. The format controller, in conformance with the selected pixel modification, generates an encoded command to the control processor that enables the generation of an appropriate laser modulation signal.

5 Claims, 3 Drawing Sheets

PIXEL RESOLUTION ENHANCEMENT EMPLOYING ENCODED DOT SIZE CONTROL

FIELD OF THE INVENTION

This invention relates to raster pixel image printers and, more particularly, to a system for improving the resolution of pixels which reside at edges of image features.

BACKGROUND OF THE INVENTION

In laser printers, a desired image is created by causing a laser to be modulated in accordance with a bit pattern stored in an image bit map. The modulated laser beam is scanned across a charged surface of a photosensitive drum in a succession of raster scan lines. Each scan line is divided into pixel areas and the modulated laser beam causes some pixel areas to be exposed to a light pulse and some not, thus causing a pattern of overlapping pixels on each scan line. Where a pixel area is illuminated, the photosensitive drum is discharged, so that when it is subsequently toned, the toner adheres to the discharged areas and is repelled by the still charged areas. Subsequently, the toner is transferred to paper and fixed in the known manner. As a result of the image's pixel configuration, image edges that are either not parallel to the raster scan direction or not perpendicular to it appear stepped.

The prior art has attempted, in a variety of ways, to overcome the stepped appearance of pixel image edges. One of the more widely used techniques is described in U.S. Pat. No. 4,847,641 to Tung, assigned to the Assignee of this application, the disclosure of which is incorporated herein by reference.

Tung shows a character generator that produces a bit map of image data and inputs that bit map into a first-in first-out (FIFO) data buffer. A fixed subset of the buffer stored bits forms a sampling window through which a selected block of the bit map image data may be viewed (for example, a 9×9 block of pixels with the edge pixels truncated). The sampling window contains a center bit cell which changes on each shift of the image bits through the FIFO buffer. As the serialized data is shifted, the sampling window views successive bit patterns formed by pixels located at the window's center bit cell and its surrounding neighbor bit cells. Each bit pattern formed by the center bit and its neighboring bits is compared in a matching network with prestored templates. If a match occurs—indicating that the center bit resides at an image edge and that the pixel it represents can be altered so as to improve the image's resolution, a modulation signal is generated that causes the laser beam to alter the center pixel configuration. In general, the center pixel is made smaller than a standard unmodified bit map pixel and is possibly moved within the confines of pixel cell. The pixel size alteration is carried out by modulating the laser contained in a "laser print engine" of the printer. The system taught by Tung is now generally referred to as Resolution Enhancement Technology (RET) and enables substantially improved image resolutions to be achieved.

In laser printers that produce black/white images, the circuitry that modulates the laser beam is directly accessible to the RET circuitry. As a result, variable length pulses generated by an RET circuit can be directly applied to modulate pixel size and to achieve the enhanced image resolution. However, in color laser printers, such direct access is, in general, no longer available. In other words, the laser's drive circuits are not available for external connection to the RET's variable width pulse generator so as to enable modification of pixel size and positioning.

In a color printer, i.e. one which prints successive yellow, magenta, cyan and black "planes", a processor is employed as the laser engine controller. The processor enables the necessary print engine control functions to be carried out in correct time order, while assuring accurate registration of succeeding color planes. To the inventor's knowledge, Resolution Enhancement Technology, as taught by Tung, has not been heretofore accomplished with a color printer.

Accordingly, it is an object of this invention to provide for the incorporation of Resolution Enhancement Technology into a color laser printer.

It is a further object of this invention to incorporate Resolution Enhancement Technology into a laser printer without requiring direct access to laser drive circuits.

It is yet another object of this invention to implement Resolution Enhancement Technology in a color laser printer, without requiring additional circuitry.

SUMMARY OF THE INVENTION

A laser printer includes a Resolution Enhancement driver for causing modulation of image edge pixels. The printer comprises a laser for discharging an electrophotographic surface in accordance with an applied modulation signal. A control processor applies modulation signals to the laser in accordance with received commands. A format controller determines if an image pixel resides at an edge of an image feature and, if so, selects a pixel modification to enhance a representation of the feature edge. The format controller, in conformance with the selected pixel modification, generates an encoded command to the control processor that enables the generation of an appropriate laser modulation signal.

DETAILED DESCRIPTION OF THE INVENTION

Figure 1:
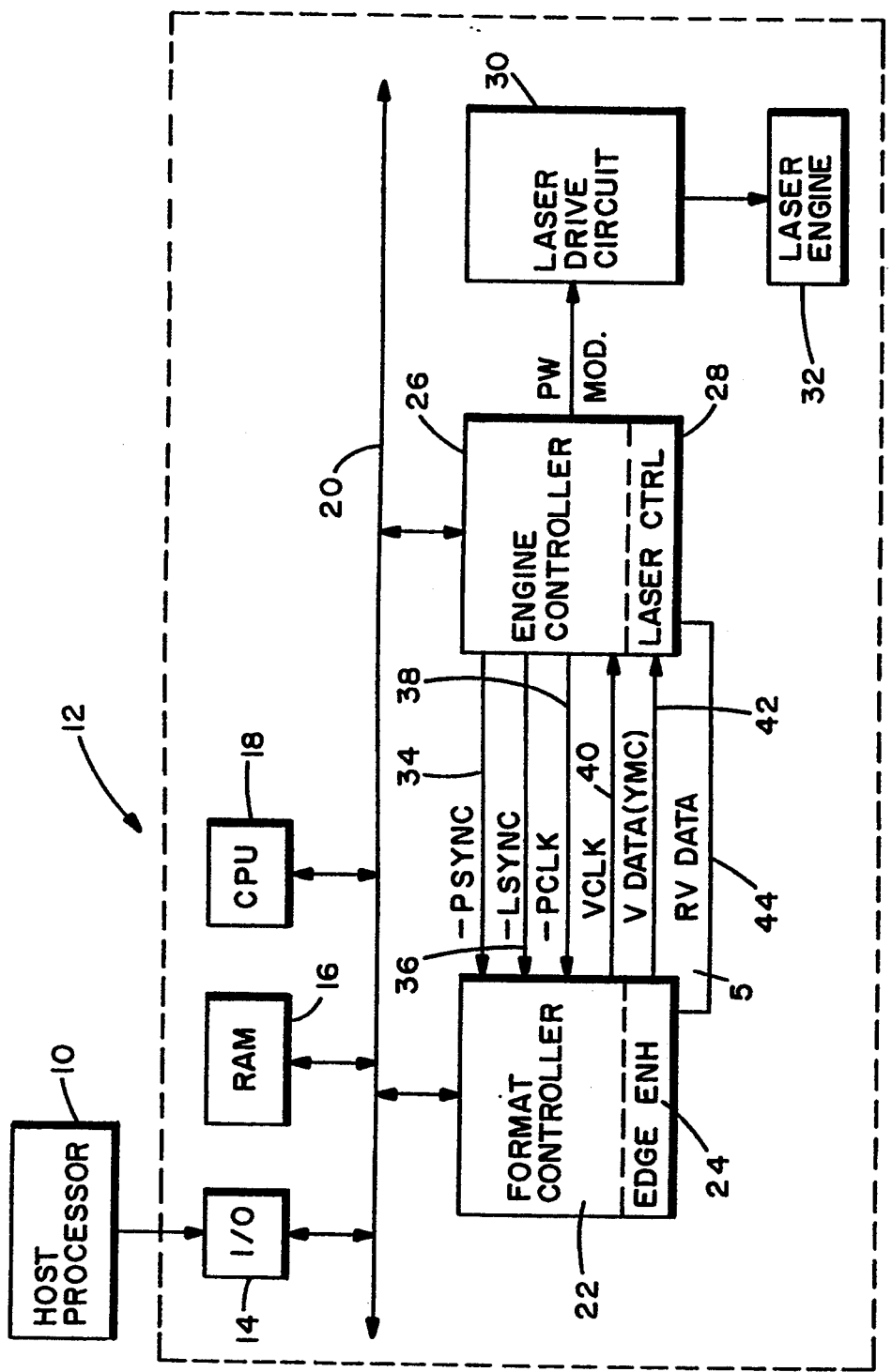
FIG. 1 is a block diagram of a laser printer incorporating the invention.

In FIG. 1, a host processor 10 transmits image data to a printer 12 (schematically shown within the dotted line). The image data is received via input/output (I/O) module 14 and is temporarily stored in random access memory (RAM) 16 under control of central processing unit (CPU) 18. Communications within printer 12 occur over bus (or busses) 20. A format controller 22 receives image data from RAM 16 and under control of CPU 18, formats the image data into raster-arranged color plane bit maps. Each bit map plane is a raster arranged image of pixels of a single color.

Format controller 22 may contain a single color plane bit map (with the remainder planes being contained in RAM 16 until ready for printing), or it may be provided with sufficient storage capacity to store all planes of an image, i.e., yellow, magenta, cyan and black planes. Format controller 22 further contains the software and circuitry for performing edge pixel enhancement procedures described in the aforementioned Tung patent. Edge enhancement circuitry 24 essentially examines a window of pixels within a bit map plane and determines the presence or absence of a match between the pattern of pixels in the window and a stored template. If a match is found, an appropriate signal is generated to enable adjustment of the configuration of the window's center pixel so as to enhance the ultimate edge representation when the bit map is printed.

Overall control of laser engine 32 is accomplished by engine controller 26 and an included microprocessor. Engine controller 26 further includes a laser control circuit 28 that enables time modulation of the output pulses fed from engine controller 26 to laser drive circuit 30. Laser control circuit 28 operates in conjunction with engine controller 26 so that, as individual pixel signals are fed to laser drive circuit 30, they are appropriately time modulated so as to both accurately represent the bit map in format controller 22, and exhibit a configuration in accordance with the determinations of edge enhancement circuitry 24. Laser drive circuit 30, in response, modulates the signal of a laser in laser engine 32 so that electrostatic printing may be accomplished.

Engine controller 26 provides a plurality of additional outputs to laser engine 32 in order to control the movement of various motors, gears, etc. to enable both paper and laser beam movement. Those interconnections are not shown to avoid over-complication of the view.

Referring to the waveform diagrams shown in FIGS. 2 and 3, the operation of the system of FIG. 1 will be described. Engine controller 26 generates the principal timing signals (under control of CPU 18) that enable operation of both format controller 22 and laser drive circuit 30. Engine controller 26 provides on output line 34, a PSYNC signal that synchronizes the printer's yellow, magenta, cyan and black, color bit map successive print operations.

Figure 2:
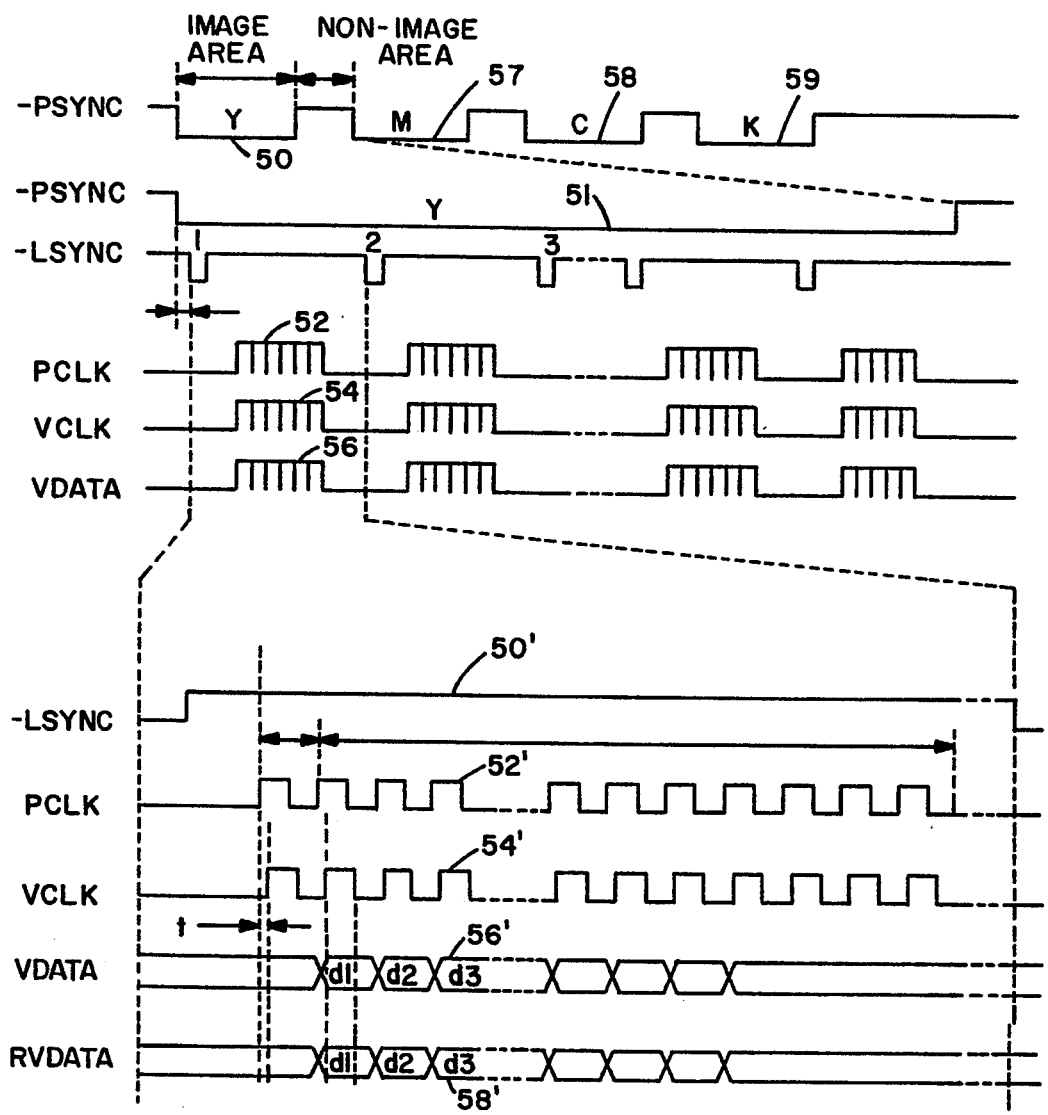
FIG. 2 is a waveform diagram helpful in understanding the operation of the laser printer of FIG. 1.

In FIG. 2, the PSYNC signal 50 for the yellow bit plane is shown in expanded form by trace 51. Engine controller 26, during the active state of PSYNC (PSYNC is active in the down state), provides a plurality of raster line synchronization pulses LSYNC on output line 36. Each LSYNC pulse occurs at the commencement of a raster scan line and causes the output of bit states representing pixels of a raster scan line. Subsequent to each LSYNC pulse, a pixel clock pulse 52 PCLK is produced, one for each pixel on the raster scan line. PCLK signals 52 are passed, via line 38, from engine controller 26 to format controller 22. Format controller 22, in response "turns around" each PCLK signal 52 and returns it to engine controller 26 as a video clock signal VCLK 54. Format controller 22 also emplaces on output line 42, data levels 56 VDATA that are representative of the pixel bit states. The data levels appearing on output line 42 represent actual pixel data and, in the case shown in FIG. 2, represent the pixel data for the yellow plane. During succeeding scan times (i.e. during magenta, cyan and black PSYNC pulses 57, 58 and 59) pixel data is transmitted similarly.

At the same time each pixel data pulse 56 (VDATA) is impressed on output line 42 from format controller 22, a five bit command signal is applied to RVDATA line 44 from edge enhancement circuitry 24. The RVDATA command indicates to laser control circuitry 28 whether the laser in laser engine 32 should be gated on, and if yes, whether the output pulse from engine controller 26 should provide for a full laser pulse or should be otherwise modulated for edge enhancement purposes.

The LSYNC, PCLK, VCLK, VDATA and RVDATA signals are shown in expanded form in the lower section of FIG. 2. Trace 50' is the expanded yellow plane LSYNC pulse and trace 52' shows the PCLK signals fed from engine controller 26 to format controller 22. Trace 54' represents VCLK signals that are fed back by format controller 22 to engine controller 26 after a short delay t.

Upon the rise of each VCLK signal, video data VDATA 56' is applied to line 42 and is latched in engine controller 26 upon the negative going shift of each VCLK signal 52'. In such manner, each pixel value is appropriately entered into engine controller 26. Simultaneously, a five bit RVDATA command 58' is applied via RVDATA line 44 to laser controller 28 so that appropriate modulation (if necessary) can be applied to the latched pixel data.

Figure 3:
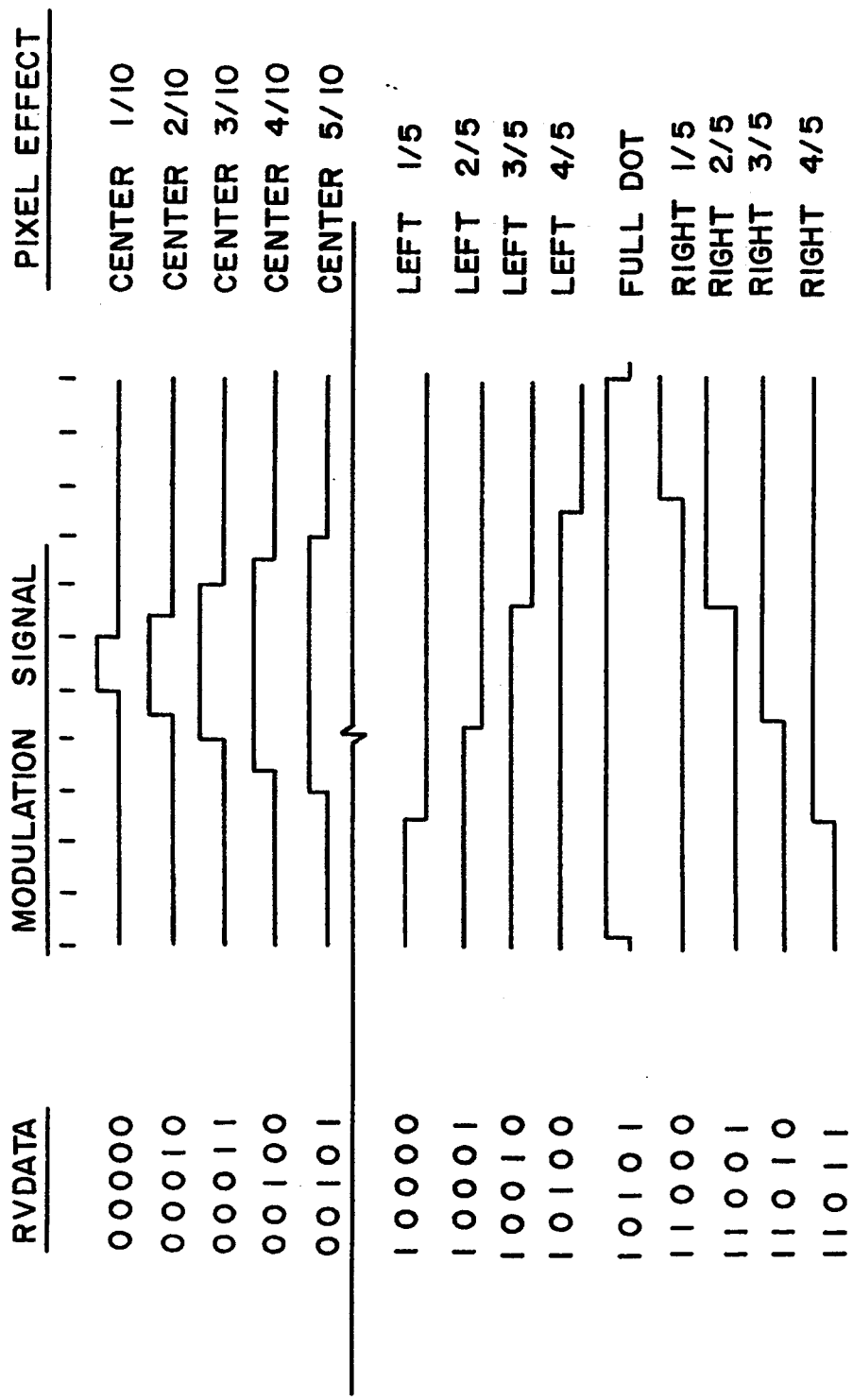
FIG. 3 is a further waveform diagram illustrating commands issued by the format controller of FIG. 1 and the resulting pulsewidth modulation signals that emanate from the laser engine controller.

As shown in FIG. 3, RVDATA commands are preferably 5 bit values that define a particular modulation signal to be outputed from engine controller 26 to laser drive circuit 30. Each RVDATA command enables a particular modulation time to be applied to laser drive circuit 30, so that it is capable of causing the printing of pixels of a variety of sizes, oriented at a plurality of positions within each pixel site. For instance, certain RVDATA commands cause modulation signals to be applied (to laser drive circuit 30) that cause the size of a pixel to be varied by tenths of a pixel cell site. Five of ten 5 bit data sets for accomplishing the 1/10 modulation are shown in FIG. 3. A pixel can also be modulated so that it is printed starting at either the left or right side of a pixel all site and extends a part of the way towards the other extremity of the pixel cell site. Thus, a full pixel can be printed or a left 1/5, 2/5, 3/5 or 4/5 of a pixel can be printed. In a similar manner, the right 1/5, 2/5, 3/5 or 4/5 of a pixel can similarly be printed under control of an appropriate 5 bit RVDATA command.

In the above described manner, format controller 22 in combination with edge enhancement circuit 24 passes 5 bit edge enhancement commands RVDATA to engine controller 26. Those commands enable engine controller 26 and laser control 28 to output variable time pulses that modulate the output from laser drive circuit 30. In response, laser engine 32 is enabled to produce a plurality of pixel sizes, with altered positions within a pixel all site. The command structure enables the modulation function to be accomplished using an already available modulation facility within engine controller 26 (laser control 28). No direct access is required to laser drive circuit 30 by format controller 22.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A laser printer for producing raster scan pixel images, including means for modulating edge pixels of an image to improve said image's resolution, said printer comprising:

laser means for exposing each pixel area of an electrophotographic surface, during a modulation signal time having a start and an end in accordance with applied modulation signals;

controller means for applying a modulation signal during each modulation signal time to said laser means in response to a received binary multi-bit command, said multi-bit command enabling said controller means to apply i) a first modulation signal that gates on said laser means at said start and gates off said laser means at a time intermediate said start and said end, or (ii) a second modulation signal that gates on said laser means at a time intermediate said start and said end and gates off said laser means at said end, or (iii) a third modulation signal that gates on and off said laser means at times intermediate said start and said end; and edge enhancement means for determining, for an image pixel that resides at an edge of an image, whether said image pixel is to be modified to improve resolution of said edge and if so, generating a said binary multi-bit command to generate either said first modulation signal or said second modulation signal or said third modulation signal to create a desired pixel modification and transmitting said command to said controller means.

2. The laser printer as recited in claim 1 further comprising:

format control means associated with said edge enhancement means for providing as an output to said controller means, pixel data representative of a bit map of an image to be printed.

3. The laser printer as recited in claim 2 wherein said controller means provides clock signals to said format control means, said format control means responding by returning said clock signals to said controller means, using said clock signals to time an output of pixel data signals to said controller means, and further using said clock signals to time an output of a said binary multi-bit command that relates to a state of a said pixel data output from said format control means.

4. The laser printer as recited in claim 2 wherein said laser means includes laser modulation circuitry that is only accessible through said controller means.

5. In a raster scan pixel image laser printer, a method for improving image edge resolution, comprising the steps of:

determining for an image pixel that resides at an edge of an image that resolution of said edge can be improved by modifying a configuration of said image pixel;

responsive to said determining step, generating a binary multi-bit command indicative of one of a plurality of unique pixel configurations;

generating a signal in response to a said binary multi-bit command that exhibits a unique, timed relationship to a pixel time period, said signal either commencing at a start of said pixel time and ending prior to an end of said pixel time or commencing at a time intermediate said start and said end of said pixel time and ending at said end of said pixel time or commencing and ending at times intermediate said start and said end of said pixel time; and modulating a laser in response to said signal so as to produce a light pulse that exposes an electrophotographic surface in a manner to achieve said unique pixel configuration.

* * * * *